United States Patent [19]
Payet et al.

[11] Patent Number: 5,332,612
[45] Date of Patent: Jul. 26, 1994

[54] PROCESS FOR DEPOSITING A LATEX COATING ON AN ARTICLE MADE OF ELASTOMER AND COMPOSITE ARTICLE BASED ON SILICONE ELASTOMER COMPRISING A LATEX COATING

[75] Inventors: Gerard Payet, Chuzelles; Constantin Tsangarakis, Lyons, both of France

[73] Assignee: Isoform, Puteaux, France

[21] Appl. No.: 53,672

[22] Filed: Apr. 29, 1993

[30] Foreign Application Priority Data

Apr. 30, 1992 [FR] France ............................ 92 05387

[51] Int. Cl.$^5$ .............................................. D06N 7/04
[52] U.S. Cl. .................................... 428/148; 427/185; 427/203; 427/204; 427/322; 427/430.1; 427/475; 428/149; 428/447
[58] Field of Search ............ 427/203, 204, 322, 412.1, 427/185, 475; 428/148, 149, 150

[56] References Cited

U.S. PATENT DOCUMENTS

| | | | |
|---|---|---|---|
| 3,577,508 | 5/1971 | Desaulniers | 427/412.1 |
| 3,812,164 | 5/1974 | Schulz | 260/375 B |
| 3,991,239 | 11/1976 | Anderson | 427/400 |
| 4,693,923 | 9/1987 | McGroarty et al. | 428/148 |
| 5,024,711 | 6/1991 | Gasser et al. | 427/203 X |

*Primary Examiner*—Michael Lusignan
*Attorney, Agent, or Firm*—Oblon, Spivak, McClelland, Maier & Neustadt

[57] ABSTRACT

The invention relates to a process for depositing a latex coating on an article made of elastomer,
wherein a continuous layer of a hydrophilic inorganic pulverulent material is deposited at the surface of the elastomer and the said article is immersed in an aqueous latex suspension.

The invention also relates to a composite article based on silicone elastomer comprising a latex coating, said composite article including a film made up of a hydrophilic inorganic pulverulent material at the interface between the silicone elastomer and the latex.

14 Claims, No Drawings

PROCESS FOR DEPOSITING A LATEX COATING ON AN ARTICLE MADE OF ELASTOMER AND COMPOSITE ARTICLE BASED ON SILICONE ELASTOMER COMPRISING A LATEX COATING

The present invention relates to a process intended to produce a latex coating on an article made of elastomer.

Some elastomers are highly hydrophobic. When immersed in a latex dispersion, the latter does not remain spread at the surface of the elastomer but tends to form droplets.

It is consequently impossible to produce a latex coating directly at the surface of an elastomer of this type without a preliminary treatment of the elastomer.

Thus, document U.S. Pat. No. 3,991,239 describes a process in which a surface treatment of the elastomer is carried out with the aid of a halogenated aqueous solution, the treatment being intended to generate hydrophilic polar sites making it possible for polymers such as polybutadienes to adhere to the surface of the elastomer.

Furthermore, processes are known in which a silicone elastomer is cast inside a latex bag to produce cushions.

The subject of the present invention is a process intended to form a latex coating on an article made of elastomer, wherein a continuous layer of a hydrophilic inorganic pulverulent material is deposited at the surface of the elastomer and the said article is immersed in an aqueous latex suspension.

The deposited quantity of hydrophilic inorganic material (in grams of material deposited per $m^2$ of the elastomer surface) may be, for example, between 0.01 and 1 $g/m^2$.

The hydrophilic inorganic pulverulent material is chosen advantageously from montmorillonites, preferably sodium-based ones, colloidal silicas, calcined silicas and pulverulent products forming a gel with water.

The mean particle diameter of the hydrophilic inorganic pulverulent material is preferably smaller than 100 micrometers.

When the hydrophilic inorganic pulverulent material is a sodium montmorillonite, it is advantageously obtained from calcium montmorillonites which are exchanged with $Na_2Co_3$, for example in a concentration of 3%.

The continuous layer of hydrophilic inorganic pulverulent material is advantageously deposited at the surface of the elastomer article by a known method such as spreading, for example by hand, electrostatic pneumatic powdering, or else by a fluidised bed process. When the article thus coated is immersed in an aqueous latex suspension, a continuous film formed by an aqueous gel which has a high rheological rigidity and high viscosity is produced at the interface between the elastomer and the layer of latex.

Because of its high viscosity, the aqueous gel thus formed will not be repelled by the hydrophobicity of the bulk of elastomer.

The elastomer is preferably a silicone elastomer.

According to an advantageous embodiment of the invention the elastomer article coated with hydrophilic inorganic pulverulent material is additionally placed in contact with an alcoholic solution of a salt intended to coagulate the aqueous latex dispersion. It has thus unexpectedly been found that the hydrophilic inorganic pulverulent material absorbs a large quantity of coagulant salt, making it possible to obtain a layer of coagulated latex distributed uniformly over the surface of the article. The thickness of the layer obtained is, furthermore, greater than that obtained with the known techniques of dipping in latex, for the same period of immersion.

The present invention makes it possible in particular to produce a latex jacket around an article made of silicone elastomer of any Shore hardness.

The operating procedure employed for this embodiment of the invention is described in greater detail below:

- an article made of silicone elastomer is prepared by conventional moulding;
- after demoulding, a thin layer of sodium montmorillonite is deposited on this silicone article either by being spread by hand or by pneumatic powdering or by a fluidised bed process, or by any other method;
- thus coated, the article is then immersed in an alcoholic solution of a salt which coagulates latex dispersions, for example a 40% solution of calcium nitrate in ethyl alcohol;
- the article is dried by evaporation of the alcohol and then immersed in an aqueous latex dispersion containing the vulcanisation products in situ.

The immersion period can vary depending on the thickness of the dry latex film which is necessary.

The article is then withdrawn from the latex bath. The dispersion is perfectly distributed over all the faces of the article including the sharp ridges.

The latex-coated article is then dried and then immersed in pure water for an appropriate time to remove the coagulant salts and then the article thus coated is dried in the oven or in air.

Another subject of the invention is a composite article based on silicone elastomer comprising a latex coating, said composite article including a film made up of a hydrophilic inorganic pulverulent material at the interface between the silicone elastomer and the latex.

The present invention finds applications, for example:

- in industries which make use of elastomers such as, for example, silicone elastomers, but which wish to protect the environment from contact with the elastomer and from antiadherent pollution, especially in the field of elastomer moulding;
- to protect a silicone gel in medical applications: antibedsore mattresses, breast prostheses, dental prostheses, components of biological prostheses, blood transfusion tubing, artificial arteries and generally in the case of any latex coating on a flexible or rigid hydrophobic substrate.

The invention can be better understood with the aid of the following example of an embodiment, no limitation being implied.

EXAMPLE

Manufacture of a Continuous Latex Film by Immersion on a Block Made of Silicone Elastomer

A) Composition of the Hydrophilic Inorganic Pulverulent Material Employed

Calcium montmorillonite exchanged into sodium montmorillonite using 3 % of $Na_2CO_3$.

Percentage analysis (on a sample dried at 105° C.):

| | |
|---|---|
| Ignition loss | 8.5% |

-continued

| | |
|---|---|
| SiO$_2$ | 59.2% |
| Al$_2$O$_3$ | 20.6% |
| Fe$_2$O$_3$ | 0.5% |
| MgO | 4.6% |
| CaO | 1.3% |
| Alkaline and miscellaneous | 5.3% |
| Particle size | 2 to 5% retained on a screen with a 74-micrometre mesh opening. |

B) Operating Procedure

1. Application by rubbing sodium montmorillonite powder over the whole surface of the block of silicone elastomer.

2. Immersion of the powder-coated block in an alcoholic solution of calcium nitrate at a concentration of 40%.

3. Drying for 1 minute at 100° C.

4. Immersion of the block in a latex emulsion (natural rubber) with a solids content of 60% (the concentration may differ) for 3 minutes (the time may vary).

5. Drying of the block coated with coagulated latex for 1 minute at 100° C.

6. Rinsing by immersing the block for 30 minutes in water at 50° C.

7. Drying of the latex-coated block in a ventilated enclosure at 40° C.

We claim:

1. A process for depositing a latex coating on an article made of elastomer, wherein a continuous layer of a hydrophilic inorganic pulverulent material is deposited at the surface of the elastomer and said article is immersed in an aqueous latex suspension.

2. The process according to claim 1, wherein the hydrophilic inorganic pulverulent material is selected from the group consisting of montmorillonites, colloidal silicas and calcined silicas.

3. The process according to claim 1, wherein the hydrophilic inorganic pulverulent material is sodium montmorillonites.

4. The process according to claim 1, wherein the hydrophilic inorganic pulverulent material is selected from inorganic pulverulent materials forming a gel with water.

5. The process according to claim 1, wherein said hydrophilic inorganic pulverulent material is deposited at the surface of the elastomeric article in an amount of between 0.01 and 1 gram per square meter of elastomer article surface.

6. The process according to claim 1, wherein the continuous layer of hydrophilic inorganic pulverulent material is deposited by spreading, electrostatic pneumatic powdering or in a fluidized bed.

7. The process according to claim 1, wherein the elastomer is a silicone elastomer.

8. The process according to claim 1, wherein the elastomer article coated with a hydrophilic inorganic pulverulent material is further placed in contact with an alcoholic solution of a salt which coagulates latex dispersions prior to immersion of the article in an aqueous latex suspension.

9. The process according to claim 1, wherein the mean particle diameter of the hydrophilic inorganic pulverulent material is smaller than 100 micrometers.

10. The process according to claim 8, wherein said salt which coagulates latex dispersions is calcium nitrate.

11. A process for depositing a latex coating on an article made of elastomer, wherein a continuous layer of a hydrophilic inorganic pulverulent material is deposited at the surface of the elastomer and said article is immersed in an aqueous latex suspension, and wherein the hydrophilic inorganic pulverulent material is a sodium montmorillonite obtained by exchanging calcium montmorillonites with Na$_2$CO$_3$.

12. The process according to claim 11, wherein said sodium montmorillonite is obtained by exchanging a calcium montmorillonite with 3% of Na$_2$CO$_3$.

13. A process for producing a latex jacket around an article made of silicone elastomer, comprising the following steps:
   a) depositing a film of a hydrophilic inorganic pulverulent material on the article made of silicone elastomer;
   b) immersing the article in an alcoholic solution of a salt which coagulates latex dispersions;
   c) drying the article;
   d) immersing the article in an aqueous latex dispersion containing vulcanisation products, and
   e) rinsing, drying and stoving the article.

14. A composite silicone elastomer article comprising a latex coating thereon, said composite article including a film made up of a hydrophilic inorganic pulverulent material located at the interface between the silicone elastomer and the latex.

* * * * *